United States Patent [19]
Schyman et al.

[11] Patent Number: 5,495,477
[45] Date of Patent: Feb. 27, 1996

[54] SIGNAL TRANSMISSION SYSTEM INCLUDING ALLOCATION OF SIGNAL ELEMENTS TO DIFFERENT CATEGORIES

[75] Inventors: Lars Schyman, Tumba; Anders Bjenne; Peter Dahlberg, both of Huddinge, all of Sweden

[73] Assignee: Telefonaktiebolaget L M Ericsson, Stockholm, Sweden

[21] Appl. No.: 214,130

[22] Filed: Mar. 16, 1994

[30] Foreign Application Priority Data

Mar. 18, 1993 [SE] Sweden ................. 9300896

[51] Int. Cl.⁶ ............................................. H04Q 11/04
[52] U.S. Cl. ..................... 370/58.2; 370/66; 370/68.1; 370/110.1
[58] Field of Search ................. 370/24, 29, 53, 370/54, 58.1, 58.2, 58.3, 60, 66, 67, 68, 68.1, 77, 79, 85.7, 95.1, 110.1, 118

[56] References Cited

U.S. PATENT DOCUMENTS

| | | | |
|---|---|---|---|
| 3,637,941 | 1/1972 | Rekiere | 370/58.2 |
| 4,160,877 | 7/1979 | Vander Mey | 370/118 |
| 4,755,988 | 7/1988 | Nelson et al. | 370/118 |
| 4,788,680 | 11/1988 | Kikuchi et al. | 370/58.1 |
| 4,805,172 | 2/1989 | Barbe et al. | 370/58.2 |
| 4,825,434 | 4/1989 | Shaio | 370/118 |
| 4,891,805 | 1/1990 | Fallin | 370/118 |
| 5,226,042 | 7/1993 | Ardon et al. | 370/68 |

FOREIGN PATENT DOCUMENTS

085256  8/1983  European Pat. Off.

*Primary Examiner*—Alpus Hsu
*Attorney, Agent, or Firm*—Burns, Doane, Swecker & Mathis

[57] ABSTRACT

A signal transmission system includes one or more signal transmitting units, one or more signal receiving units and a medium adapted for the transmission of selected signals. A transmitted signal carries a number of signal elements which have been allocated to the same or different categories. A number of signal elements that have been allocated to the same category can be coordinated in a receiving unit to form predetermined information. The system includes a unit to increase the number of signal elements that have been allocated to one category (CTS) at the cost of the number of signal elements that have been allocated to another category (DTS) and/or a third category, and so on, or alternatively to carry out one or more selected functions within equipment connected to the receiving unit.

6 Claims, 4 Drawing Sheets

SIGNAL TRANSMISSION SYSTEM INCLUDING ALLOCATION OF SIGNAL ELEMENTS TO DIFFERENT CATEGORIES

TECHNICAL FIELD

The present invention relates to a signal transmission system for transmitting information from one or more transmitting units to one or more receiving units.

Means for the selected transmission of signals are located between the transmitting and the receiving units.

Each transmission adapted signal carries a number of signal elements to which mutually similar or mutually different categories are allocated.

A plurality of such signal elements to which the same category has been allocated can be coordinated in a selected receiving unit so as to form predetermined information.

DESCRIPTION OF THE KNOWN PRIOR ART

Signal transmission systems of the aforedescribed kind are known to the art. For instance, there is known to the art a system in which a plurality of time slots having a predetermined number of bit positions are coordinated to form a time frame.

Each time frame is synchronized by means of selected bit combinations in a number of initial time slots (BTS-signals), these initial or leading time slots being followed by a large number of time slots of which a few are normally allocated a bit configuration which causes the information contained in the time slots to steer different functions, whereas a predominant number of the time slots are allocated a bit configuration which causes the information in the time slots to function as speech information carriers or the carriers of some other information.

Also known to the art is a signal transmission system which utilizes data cells or data words where a plurality of such data cells having one and the same address are required to form predetermined information.

The inventive signal transmission system has been proposed primarily for the transmission of signals, internally and/or externally, in switching equipment for the purpose of connecting telephone calls, effecting data switch-over and like procedures.

Several different types of switching equipment included in telecommunications systems are known to the art.

One example of the principle of a switching system which exhibits the aforesaid features and in which the present invention can be used to advantage, includes a plurality of terminating units to which incoming connections (Link to Switch) and outgoing connections (Switch to Link) are established.

In other switching cases, an incoming connection can constitute an outgoing connection and vice versa.

A number of terminating units are able to coact with one and the same multiplexing unit over internal inks. A number of multiplexing units are structured to form a selector unit and function as a coupling device or a switch matrix.

It is also known to connect to one or more terminating units control means including a processor or processor unit, other links and/or connections associated with the control means.

In the case of switching equipment of this kind, it is necessary to utilize a number of devices which are associated with the internal links and which allocate a particular category to respective time slots, and to ensure that each of these devices will provide a predetermined category distribution of the categories allocated to the time slots which is adapted to normal operating conditions.

These devices, normally using memory stores, have in normal operating conditions a specific configuration which at least in the case of certain links selects more user formatted DTS-signals than the switch-internal CTS-signals, since the need to transmit user-formatted information content is greater than the need for control signals.

Thus, in normal operation, it is possible to select the ratio between DTS-signals or DTS-time slots and CTS-signals or CTS-time slots so as to lie beneath the value 100:1.

It is also known that when the entire switching equipment, or large parts thereof, needs/need to be configured (in startup routines) or to be reconfigured (in the case of temporary faults), it is necessary to transmit large quantities of switch-internal control information in the form of CTS-signals via links and between units.

Regarding the state of the art it must be mentioned the publication EP-A2-0 085 265, wherein is disclosed a digital time-division switch comprising a multiplexer, which multiplexes digitalized voice signals.

This embodiment uses subscriber circuits LCo, interoffice trunk circuits TKo, tone trunk circuits TNT and a multiplexer MPX for multiplexing a plurality of input signals.

Figure 2:
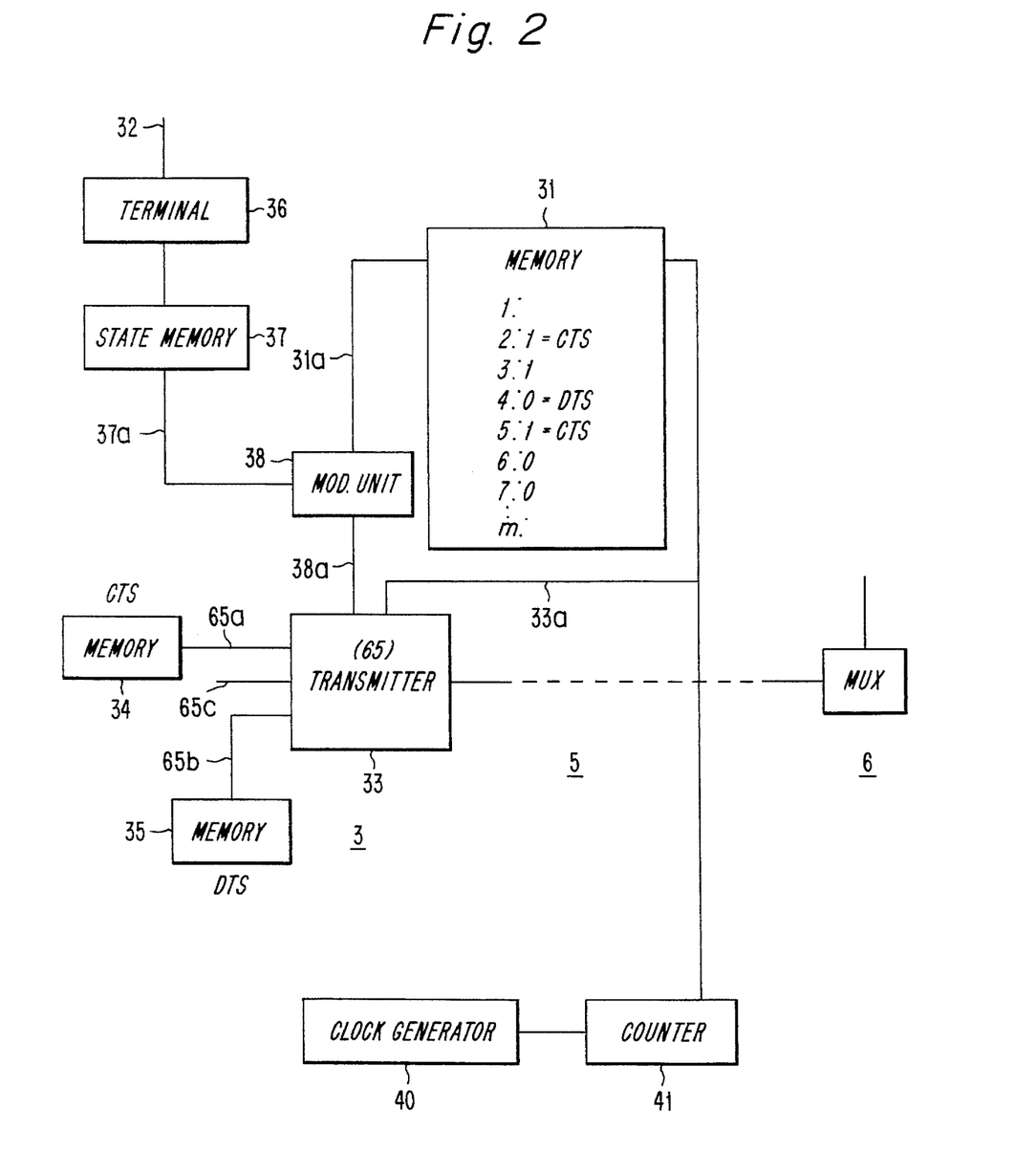
FIG. 2 is a block schematic of one among several available links for signal transmission in one direction within the switching equipment, including associated category allocating means where the present invention finds use.

The multiplexer MPX is generating an number of sequentially oriented time frames, where one is shown in FIG. 2a, and the time slots for each time frame are coordinated to carry signal units in the form of data.

Some time slots TSo–TSi are group related and carry control data (SCN), other group related time slots $TS_{i+1}$–$TS_j$ carry tone signal data (TONE) and still other group related time slots $TS_{j+1}$–$TS_n$ carry voice signal data (Voice).

The number of time slots within each group is fixed.

This system is based upon the principal that from each time frame shall be extracted a group of time slots.

Thus the circuit (D) shall extract control data time slot information, whereby the time frame has the configuration shown in FIG. 2c.

Thereafter the switching network (SW) shall extract the group of tone signal data (TCNE), whereby the time frame has the configuration shown in FIG. 2d.

Processed data in the control unit (PU) can via a circuit (I) add a new group (SD) into the time slots that previously were allocated for control data (SCN). (See FIG. 2a)

Figure 6:
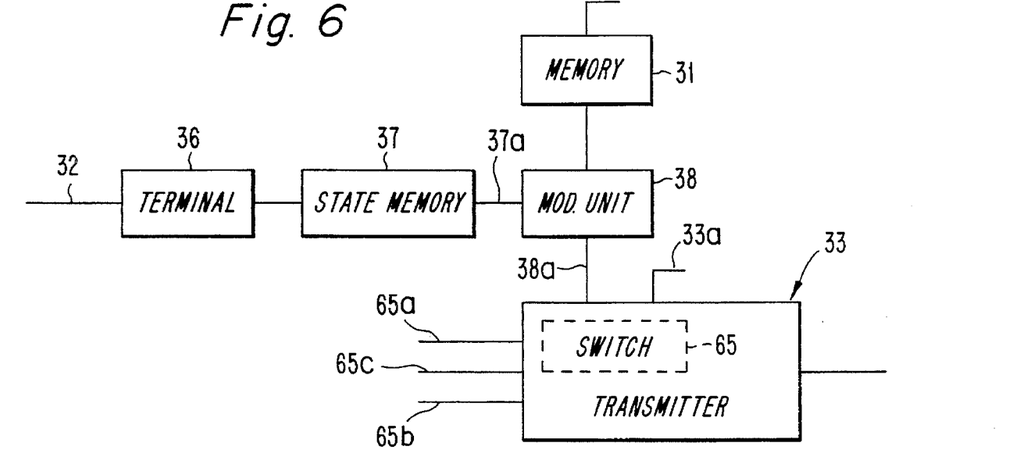
FIG. 6 is a block schematic of one embodiment in which a means has a specific configuration which can be inhibited to the advantage of superordinate control signal.

Referring to FIG. 6 it is shown how the time slots for voice signals have been increased with a group of additional time slots.

SUMMARY OF THE INVENTION

TECHNICAL PROBLEMS

When considering the known prior art as exemplified above, it will be seen that in the case of a signal transmission system which includes one or more signal transmitting units, one or more signal receiving units and a medium adapted for selected signal transmission, and in which one (or each) transmitted signal carries a number of signal elements to which the same or different categories have been allocated, and in which several such signal elements to which the same category has been allocated can be coordinated in a receiving unit to form predetermined information, a technical problem resides in the ability to change temporarily the distribution between the category allocation and the category distribution of utilized signal elements so as to be able to obtain a selected desired effect and/or a selected desired function more quickly.

A technical problem also resides in realizing the simplifications that can be achieved by increasing the number of signal elements to which one category can be allocated at the cost of the number of signal elements to which there can be allocated a second and/or a third, etc., category.

It will also be seen that a technical problem resides in realizing those advantages that are afforded by adapting a selected percentage of the number of signal elements that are allocated a chosen category in accordance with the chosen effect and/or function.

Another technical problem resides in the provision of simple measures which will enable the selection of a fixed ratio between the number of signal elements that are allocated one category and the remaining categories from several available fixed ratios, or to select a ratio which can be varied by a selected percentage.

When considering the aforedescribed prior art, it will be seen that a technical problem resides in the provision of conditions with the aid of simple means which, when necessary, will enable a large number of time slots to be allocated another category which corresponds to the need at that time, for instance so as to enable the number of CTS-signals or CTS-time slots to be increased at the cost of a reduction in the available DTS-signals or DTS-time slots within each time frame.

It will also be seen that a technical problem resides in realizing the importance of being able to choose between allowing all DTS-signals to be inhibited and to transmit solely CTS-signals in their stead, or to permit a predetermined number of DTS-signals (and/or their distribution) to be inhibited within a number of time frames.

Another technical problem resides in realizing the importance of allowing such desired instantaneous category changes to be controlled by a control signal to which a higher priority is allocated.

Another technical problem resides in realizing the importance of providing conditions which will enable pre-configured devices which belong to internal links and which are intended to allocate a predetermined category membership to the information within each selected time slot to be activated so that the number of CTS-time slots and DTS-time slots within one and the same time frame can be markedly changed instantaneously for an increasing number of available CTS-time slots at the cost of a corresponding reduction in the number of available DTS-time slots, so as to create conditions for rapid reconfiguration of the category membership of the signals.

In addition, a technical problem resides in realizing the advantages that are afforded by being able to use within selected time intervals each DTS-time slot within each time frame as a CTS-time slot.

Another technical problem resides in the ability to readily choose between completely blocking a link for user formatted information transmission during those time intervals in which solely switch-internal signalling information is required, or to choose to greatly restrict user formatted information transmission during those time intervals when only large quantities of switch-internal signalling information is required.

It will also be seen that a technical problem resides in realizing the time gains that can be achieved with such restructuring or reconfiguration with regard to the startup or restart of switching equipment when the content of the devices or memory stores concerned is uncertain or has been lost completely.

SOLUTION

The intention of the invention is to solve one or more of the aforedescribed technical problems on the basis of a system of the kind defined in the introduction, where the system requires the use of particular means for increasing the number of signal elements that are allocated one category at the cost of the number of signal elements that are allocated a second and/or a third category, and so on, within a predetermined time period, or alternatively for carrying out one or more selected functions within equipment connected to a receiving unit.

According to suggested embodiments that lie within the scope of the present invention, there is afforded the possibility of selecting the number of signal elements that are allocated said category.

According to one embodiment, the aforesaid means functions to activate a preprogrammed memory store with a predetermined category allocation of each signal element or a time controlled signal which forces a selected category on an occurrent signal element, or vice versa.

According to one particular embodiment, the system is supplemented with means which functions to so influence one or more pre-configured allocatable memories as to suppress or inhibit a number of available signals of one category, such as information carrying (speech signal carrying) DTS-time slots, and correspondingly increase the number of available signals of a second category, such as control signal information carrying CTS-time slots, with the intention of increasing the information content required for control purposes.

According to further suggested embodiments that lie within the scope of the invention, the category allocation effected by said means can be changed in a controllable fashion.

It is also proposed that the allocation of categories by said means can be inhibited upon the occurrence of a superordinate or main control signal which activates solely CTS-time slots.

It is also proposed that said means is connected to an input of a modifier whose other input is connected to a state memory, wherein the output of the modifier is connected to a switch unit associated with a transmitter.

ADVANTAGES

Those advantages that are primarily afforded by the inventive system reside in the provision of conditions which enable the number of available signals of one category, such as control signal information carrying CTS-time slots to be increased quickly and instantaneously at the cost of a corresponding reduction in the signals of a second category, such as information carrying (speech signal carrying) DTS-time slots, and therewith enable all or a large part of the functions of switching equipment to be configured and/or reconfigured, for instance when starting-up, both quickly and systematically.

BRIEF DESCRIPTION OF THE DRAWINGS

The present invention will now be described in more detail with reference to a preferred embodiment of an arrangement that can be used in a signal transmitting system in accordance with the present invention, and also with reference to the accompanying drawings, in which.

BEST MODE OF CARRYING OUT THE INVENTION

Figure 1:
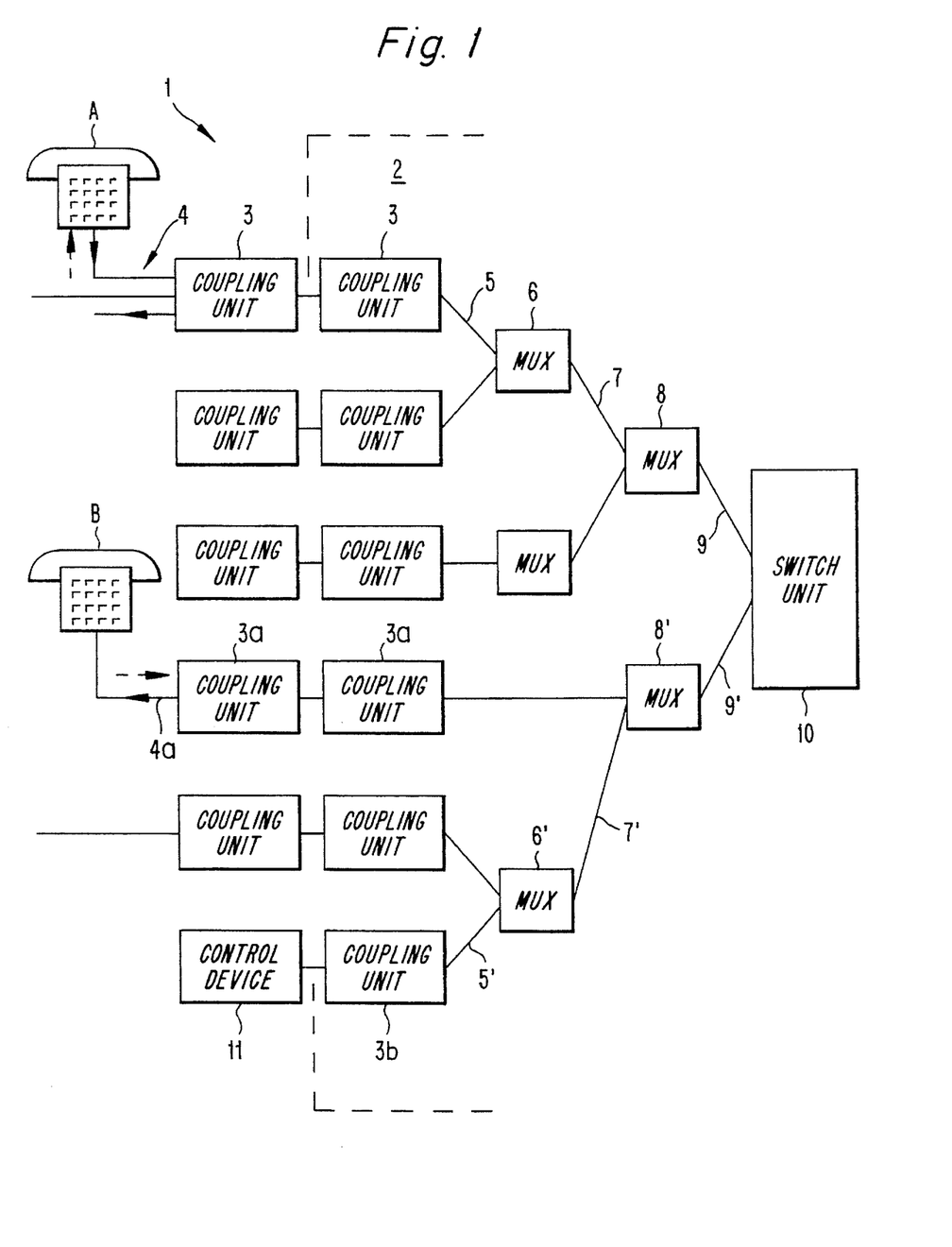
FIG. 1 is a block schematic of switching equipment included in a telecommunications system and in which the present invention finds particular application.

FIG. 1 is a block schematic illustrating the principles of switching equipment that may advantageously be incorporated in a telecommunications system.

In the FIG. 1 illustration, the telecommunications system is referenced generally 1, while the switching equipment is referenced generally 2.

The switching equipment 2 includes a number of incoming connections 4 which are each connected by one of a number of available first coupling units or terminating units 3, and a number of outgoing connections 4a which are connected by one of a number of available second, corresponding coupling units or terminating units 3a.

It should be observed that one and the same coupling unit may function to couple an incoming connection and/or an outgoing connection. It should also be observed that each coupling unit 3, 3a includes two portions, one located inside the exchange 2 and one located outside the exchange 2.

The connections and links described here are normally adapted for two-way traffic, even though only a single information direction is described in the following description, for reasons of simplicity.

The coupling units, such as the units referenced 3, 3a and 3b, are comprised of terminating units (Switch Terminating Unit) and each of these units is connected to a "superordinate" unit 6 by (one or more) links.

These superordinate units are comprised of multiplexing units (Terminal Connecting Unit) and are connected together by further internal links.

In this description, we are content with illustrating that the unit 3 is connected to the unit 6 via a link 5, and that information is exchanged from the unit 3 to the unit 6. (Link to Switch).

However, the multiplexing unit 6 is also connected to a further multiplexing unit 8 by means of one or more links 7, and the multiplexing unit 8 is, in turn, connected to a switch unit 10 by means of one or more links 9, said unit 10 functioning as the switch core or matrix.

The terminating unit 3b of the FIG. 1 illustration is connected to a control device 11 which includes a processor unit and which is adapted for superordinate control of the functions in the switching equipment 2. Links 5', 7' and 9' and multiplexing units 6' and 8' can be used to this end.

It can be mentioned by way of example that when a subscriber A connected via the incoming connection 4 wishes to be placed in speech connection with a subscriber B, the control device 11 will evaluate the wishes of the A-subscriber via selected links and multiplexing units and also via the switching unit 10, and select in accordance therewith a free connection route through the switching core 10 and select appropriate links within the switching equipment to establish a speech connection between the subscriber A and the subscriber B, via the outgoing connection 4a.

In order to achieve this speech connection, it is necessary to transmit a number of switch-internal control signals having the requisite information content.

An established speech connection requires the transmission of user formatted information content, such as speech signals, and also to a lesser extent switch-internal control signals.

The requisite information content is transmitted by selected bit configurations occurring within mutually sequential time slots, where a number of time slots are coordinated to form a time frame.

Normally, time slots which occur within several time frames are required to transmit a selected complete information content.

In order to facilitate understanding of the illustrated signalling system, it can be mentioned that all time slots "TS" are allocated different group membership, so-called ATS-time slots and BTS-time slots.

Each time frame includes a number of BTS-time slots which are normally allocated specific positions in the time frame.

Each time frame normally contains a large number of ATS-time slots, which are also allocated specific positions in the time frame.

It can thus be mentioned that the so-called BTS-time slots carry information through the bit configuration chosen in the time slot, this bit configuration being required, among other things, to synchronize transmitted data flow in the form of bit configurations. Although these bit configurations can occur within each available time slot, it has been assumed in FIG. 4 for the sake of simplicity that a BTS-time slot occurs at the beginning a of each time frame.

The invention requires no detailed description of the number of BTS-time slots within a time frame nor a specific description of their specific positions or their functions.

On the other hand, the invention does require a more detailed description of the ATS-time slots and of the necessary selection and category allocation.

It is necessary to allocate each time slot among all ATS-time slots a category membership in order to structure the information content of transmitted bit configurations.

Two categories are of particular significance, however, in obtaining an understanding of the present invention, a first category, so-called CTS-signals or CTS-time slots, and a second category, so-called DTS-signals or DTS-time slots.

CTS-signals are concerned with switch-internal signals which occur within a time slot and which are intended to serve as signal information for the requisite control of switch associated functions.

DTS-signals are concerned with user formatted signals which occur within a time slot and which are intended to serve as signals for carrying requisite user-initiated information (such as speech signals) or information content.

The exchange of signals is thus effected with the aid of the digital data flows, wherein one part-data flow is included in one time slot. A number of such time slots are coordinated to form a time frame. Normally, a number of time frames are required to carry all of the signal information.

Although the embodiment illustrated in FIG. 2 shows only one signal transmission direction, from the unit 3 to the unit 6, it will be understood that in the switching equipment illustrated in FIG. 1 it shall be possible to exchange information in both directions in all links and connections.

All signals to be sent from the unit 3 to the unit 6 are compiled of information content occurring in the form of sequentially allocated digital part-data flows or data flows and are coordinated in time slots.

As previously mentioned, these data flows are divided sequentially in time frames and in time slots. Each time slot, one or which is shown in FIG. 3, contains information in the form of a word which includes a predetermined number of bit positions, such as n number of bit positions.

Figure 3:
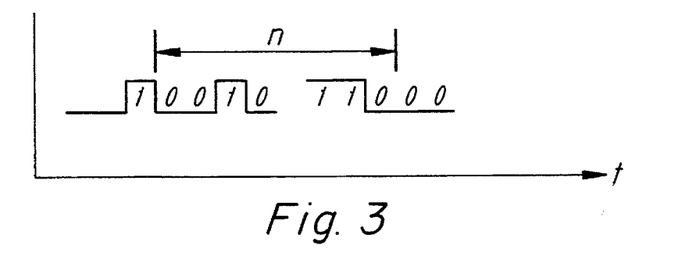
FIG. 3 illustrates an example of the structuring of a time slot.
Figure 4:
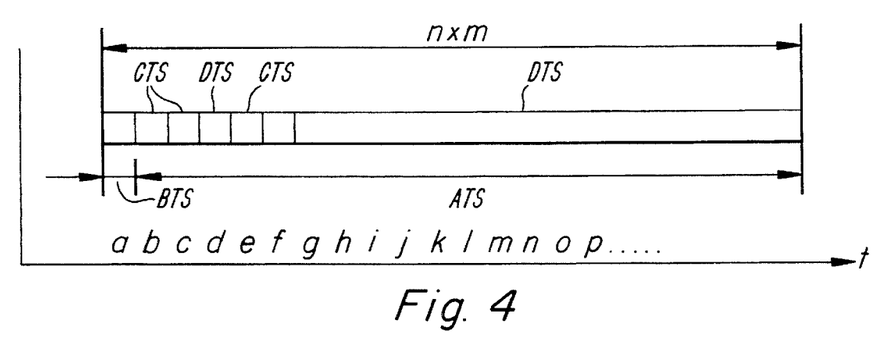
FIG. 4 illustrates an example of the structuring of a time frame constructed from a number of time slots.

FIG. 4 illustrates a complete time frame which is comprised of a predetermined number of the time slots illustrated in FIG. 3, for instance m number of time slots.

As illustrated in FIG. 4, each time frame begins with a predetermined number of time slots of specific group membership, a so-called BTS-signal or BTS-time slot, although in the case of the illustrated embodiment only one such time slot is shown for the sake of simplicity, this time slot being intended to create time-wise frame locking and to provide a reference time point for the remainder of the time slots in the time frame.

Following a BTS-time slot a in FIG. 4 is a large number of allocatable time slots (b–p . . . ), all of which have a group membership and fall within the designation ATS-time slots. Each of these ATS-time slots is divided into different categories, either into a CTS-time slot or a DTS-time slot.

By "allocatable" time slots is meant time slots in which each time slot can be selectively allocated one among several available categories, in the present application a CTS-time slot or a DTS-time slot.

Each of the CTS-time slots carries a bit configuration which is at least partially representative of the control signals required to maintain and restructure the functions within the switching equipment.

A complete control signal will normally require an information content which requires the use of a number of CTS-time slots either within one and the same time frame or divided among a number of time frames.

Furthermore, a number of CTS-time slots may carry information which is intended to change a prevailing category division or to point-out categories in said means.

By this is meant that when starting-up or when the control unit 11 establishes the need to change the signal transmission pattern, to change the allocation, in the transmission from the unit 3 to the unit 6, a packet of CTS-signals or CTS-time slots is sent from the unit 6 to the unit 3 so as to restructure the connection—the unit 3 to the unit 6—for instance to send many more CTS-signals.

The invention includes means for this changed signal structure, as will be described in more detail herebelow.

The DTS-time slots carries a bit configuration which is user formatted and therewith significant to the information content, i.e. the actual communication content (speech signals, telefax signals, data signals and so on).

By choosing one of two special binary combinations for given selected bit positions within each time slot, the receiver 6 is able to establish whether or not a received time slot shall be interpreted as containing CTS-signals or DTS-signals.

The invention does not include those means that are required in the receiver 6 to interpret and control the function within the switching equipment in response to the category membership of each time slot and its bit configuration, and consequently this part of the system will not be described in detail.

In normal operation of the switching equipment and when the signal transmission load on the link 5 is normal, each time frame need only contain a few (at times only one) CTS-time slots, and consequently a predominant part of the available allocatable time slots can be allocated the category DTS-time slots.

As will be understood, it is natural that in the normal operation of the switching equipment, the need for information content and exchange will greatly exceed the need of switch-internal control signals.

Thus, it is normal to allot to the allocating devices or memories a predetermined position for and distribution between CTS-time slots and DTS-time slots, this division or distribution being adapted directly to normal traffic conditions on the link.

Figure 5:
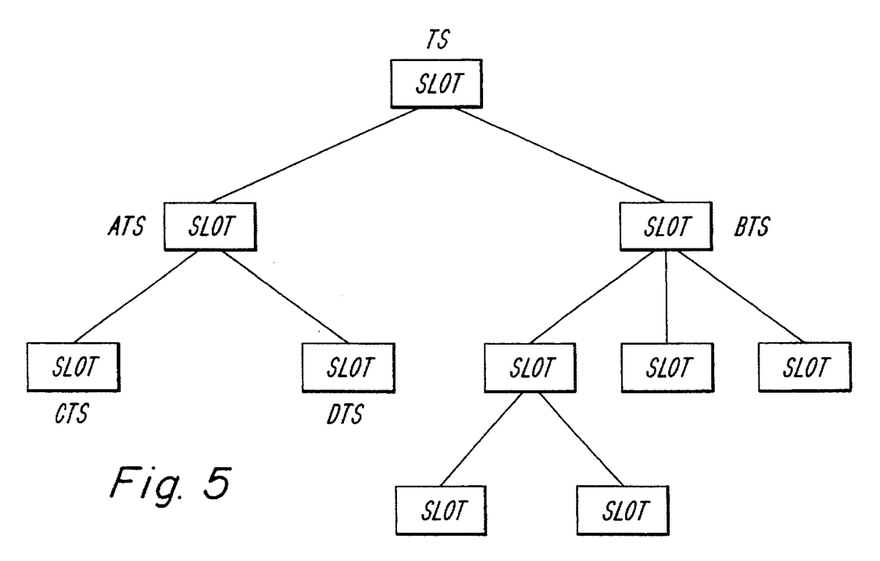
FIG. 5 illustrates schematically requisite selection between the group membership of the time slots and the subsequent category membership.

FIG. 5 shows that each transmitting unit 3 must include means for distributing occurrent time slots TS so as to sort-out these time slots either as an allocatable ATS-time slot or as a non-allocatable BTS-time slot, and also means which enables these time slots to be divided further in accordance with category membership.

However, the invention is based on the concept of evaluating each ATS-time slot to establish whether this time slot shall be allocated the category of a CTS-time slot or a DTS-time slot.

Referring back to FIG. 2, it will be seen that the unit 3 includes means, among other things in the form of a memory 31, which allocates a group and category to occurrent time slots, said means being pre-configured for normal traffic conditions in the manner shown. A first position "1" applies to non-allocatable BTS-time slots, and remaining positions "2-m" apply to allocatable ATS-time slots.

When a bit position in the memory 31 is a logic "1", the time slot in question shall be interpreted as a CTS-time slot, whereas when the bit position is a logic "0", the time slot shall be interpreted as a DTS-time slot.

The memory 31 is addressed from a time slot counter 41 which is counted-up by a clock pulse generator 40.

Thus, in position "2", a logic "1" will be delivered on the line 31a and in the absence of the invention (not 38) the signal is fed directly to a switch 65 in the transmitter 33.

The same also applies to position "3". In position "4", a logic "0" is delivered on the line 31a, and so on through all memory positions.

FIG. 2 also illustrates schematically that the distribution of categories, represented by the illustrated content of the memory 31, can be ignored under some conditions and in some time sections to the benefit of another temporary category distribution.

There is required to this end a signal modifying unit 38 which can be activated by a control signal on line 32.

The category distribution or division on a line 38a can be chosen through the signal modifying unit 38, either as the content of the memory 31 (normal mode) or with some other category distribution or division.

When the unit 6 sends a signal on a line (not shown) to a receiver (not shown) in the unit 3 requesting a changed or a selected category division, there occurs on line 32 a signal which functions as an input signal to a terminal 36, which receives requisite information which can be interpreted as activate "Packet mode" or inhibit "Packet mode" and therewith pass to normal mode.

Upon receipt of the signal on the line 32 to activate or inhibit "Packet mode", there is activated a state memory 37 which is connected to the signal modifying unit 38 by a line 37 and the nature of which will be described in more detail herebelow with reference to FIG. 6.

If the signal on the line 32 is of the nature which enables one available modifying pattern to be selected from a number of available modifying patterns, the system will include a terminal 36 which interprets the content of the signal, and a unit 37 which memorizes the signal content and the choice.

Activation which corresponds to a chosen modifying pattern is effected via the signal modifying unit 38 on line 38a.

These alternative possibilities will be described in more detail with reference to FIG. 6 and FIG. 7.

In a normal mode, the content of the memory 31 will be interpreted such that with each ATS-time slot, the memory 31 is asked whether the time slot concerned shall contain CTS-information or DTS-information.

When a logic "1" is present in the momentary position of the memory 31 and a normal mode prevails, a logic "1" will occur on line 31a and pass the unit 38 unchanged through the unit 38 and thereafter occur on the line 38a. The signal is delivered to the transmitting unit 33 which then collects information stored in a memory 34 for CTS-time slots via the selector 65, and transfers the information or the bit configuration stored in the memory, via the transmitter 33 to the receiving unit 6, over the link 5 and within the time space of the time slot concerned.

When a logic "0" occurs in a position "4", interpretation is such that the selector 65 will collect information stored in a memory 35 for DTS-time slots and transmit the information or bit configuration stored in said memory to the unit 6, over the link 5 and within the time space of the time slot concerned.

Also shown in FIG. 2 is a line 33a over which the value of the counter 41 is transmitted, and each time-section within which an ATS-time slot shall occur can be decided in the unit 33.

Information is collected from the memory 34 over a line 65a, while information is collected from the memory 35 over a line 65b.

Information other than CTS-information and DTS-information can be collected over a line 65c, although this facility is not concerned directly with the present invention.

When it is necessary to reconfigure the selector, for instance due to desired changes, voltage failure, overloading, uneven loads, or when starting-up switching equipment when the storage positions and category pointers of the allocating memories 31 are not known, or when there is doubt as to the content of the memories, there will be a sudden need for a large number of CTS-signals, whereas the number of DTS-signals required can be reduced or totally excluded.

The invention is based on the understanding that in a startup procedure or like procedure for the switching equipment 2 when normal operation no longer exists, it is possible to reconfigure the switching equipment very quickly by drastically reducing the number of DTS-time slots to the benefit of a corresponding increase in the number of CTS-time slots, so that the whole of the allocatable information content of the time frame, or substantially the whole of said allocatable information content, can be comprised of switch-internal control signals.

To this end, the invention proposes the use of a terminal 36 which interprets incoming signals on line 32 and stores the information in a state memory 37, as illustrated in FIG. 6.

The state stored in the state memory 37 remains until a signal relating to another state is detected in the terminal 36, this new state being stored in the memory 37.

When the signal on line 32 is interpreted to mean that "Packet mode" shall be activated, it is proposed in accordance with one embodiment that all ATS-time slots within each time frame are allocated CTS-time slot information via a modifier 38.

Figure 7A:
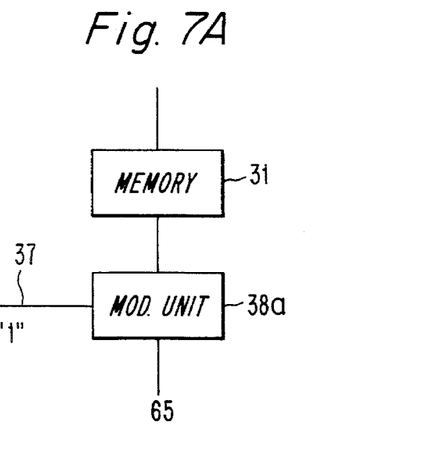
FIGS. 7A, 7B, 7C illustrate an example of equipment which generate different degrees of inhibition.

As illustrated in FIG. 7A, this can be effected in a manner which constantly inhibits the output signals 31a from the memory 31 and to allocate CTS-information to each ATS-time slot, irrespective of the content of the memory 31.

Accordingly, the modifier 38 may have the form of an OR-gate 38a, where the output signal from the state memory 37 is constantly a logic "1" and irrespective of whether the memory 31 generates a logic "0" or a logic "1" for each time position, the selector unit 65 will obtain a logic "1" from the line 38a and therefore select CTS-signals or CTS-information for each time slot.

It also lies within the scope of the invention to include under "Packet mode" a given small message transmission with DTS-signals simultaneously with a large number of CTS-signals.

Figure 7B:
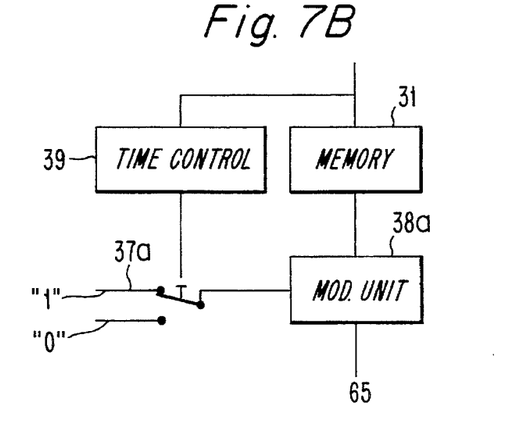

FIG. 7B illustrates an alternative embodiment which includes an OR-gate 38a similar to the FIG. 7A embodiment, but in which a time control circuit 39 activated by the time slot counter 41 is constructed to inhibit a logic "1" from the state memory 37 for given selected time slots and the content of the memory 31 for these time slots is given higher priority during these time sections.

An alternative embodiment (FIG. 7C) requires the signal on the line 32 to contain information concerning a specific choice of one memory configuration from among a number of available memory configurations.

Figure 7C:
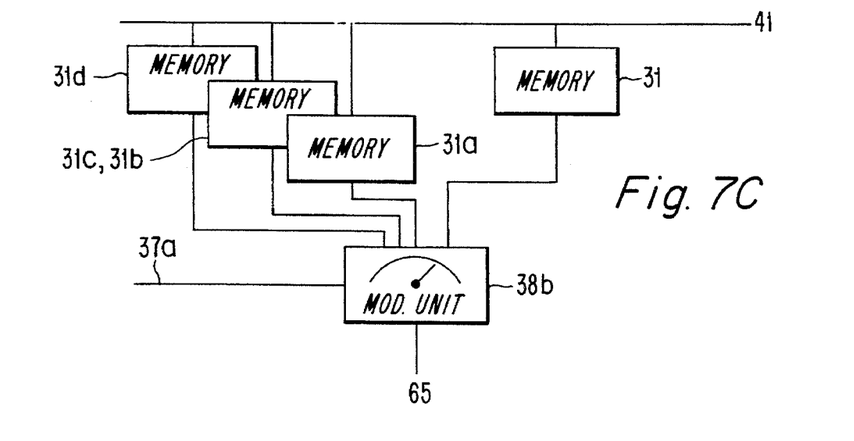

In the embodiment illustrated in FIG. 7C, there is used a modifier in the form of a selector 38b which is able to select in response to signals from the state memory 37 a category distribution represented by one memory selected from a number of available, preferably fixed or read-only memories 31a–31d, where the memory chosen has a category division and a configuration which differs from the distribution and configuration in the memory 31. Normally, the memories 31a–31d will activate, either completely or partially, CTS-time slots for all ATS-time slots.

In principle, the invention proposes that signal elements that are allocated a first category (CTS-time slots) shall increase in number at the cost of signal elements that are allocated a second category (DTS-time slots), and signal elements that are allocated a third category, and so on.

According to a number of embodiments, this increase may be chosen to include between 50% and 100%.

It will be understood that the invention is not restricted to the aforedescribed and illustrated exemplifying embodiments thereof and that modifications can be made within the scope of the following claims.

We claim:

1. A telecommunications switching system comprising:

a plurality of incoming communication channels received via first coupling units;

a plurality of outgoing communication channels transmitted via second coupling units;

coupling means for connecting one of the plurality of incoming communication channels with one of the plurality of outgoing communication channels, the one of the plurality of outgoing connections being indicated by control signals on the one of the plurality of incoming connections;

means for generating the control signals and transmitting the control signals via incoming communication channels, the control signals including time-division digital data flows, each time-division digital data flow including frames, each frame having a number of control-time slots and a number of data-time slots; and a plurality of category allocating means associated with corresponding channels, each category allocating means pre-configured by a processor associated with the control means, for identifying each time in each frame of each time-division data flow as a control-time slot, or a data-time slot, each category allocating means including frame control means associated with an outgoing communication channel for influencing an output signal from one or more of said category allocating means and for decreasing the number of data-time slots and increasing the number of control-time slots.

2. A system according to claim 1, wherein the category allocating means changes the number of control-time slots in a controlled manner.

3. A system according to claim 1, wherein the category allocating means is disabled by a superordinate control signal from the control means which activates solely CTS-time slots.

4. A system according to claim 1, wherein the catagory allocating means is connected to an input of a modifier, which has another input connected to a state memory and an output of said modifier is connected to a selector unit.

5. A system according to claim 1, wherein the number of control-time slots is increased by an amount between 50% and 100%.

6. A system according to claim 1, wherein the frame control means includes a memory for storing predetermined category allocations.

* * * * *